United States Patent
Sullivan

(10) Patent No.: US 11,785,634 B2
(45) Date of Patent: Oct. 10, 2023

(54) RETURN LINK PRIORITIZATION OF SELECTIVE EVENTS ON A MOBILE PLATFORM

(71) Applicant: Viasat Inc., Carlsbad, CA (US)

(72) Inventor: William F. Sullivan, Carlsbad, CA (US)

(73) Assignee: Viasat, Inc., Carlsbad, CA (US)

( * ) Notice: Subject to any disclaimer, the term of this patent is extended or adjusted under 35 U.S.C. 154(b) by 74 days.

(21) Appl. No.: 15/930,236

(22) Filed: May 12, 2020

(65) Prior Publication Data

US 2020/0275461 A1 Aug. 27, 2020

Related U.S. Application Data

(62) Division of application No. 15/484,780, filed on Apr. 11, 2017, now Pat. No. 10,701,713.

(51) Int. Cl.
*H04W 72/566* (2023.01)

(52) U.S. Cl.
CPC ................................ *H04W 72/569* (2023.01)

(58) Field of Classification Search
CPC ................................................ H04W 72/1242
See application file for complete search history.

(56) References Cited

U.S. PATENT DOCUMENTS

| | | |
|---|---|---|
| 5,278,828 A | 1/1994 | Chao |
| 6,052,375 A | 4/2000 | Bass et al. |
| 6,460,085 B1 | 10/2002 | Toporek et al. |
| 6,847,801 B2 | 1/2005 | De La Chapelle et al. |
| 6,959,168 B2 | 10/2005 | Parkman |
| 7,187,681 B1 | 3/2007 | O'Toole, Jr. et al. |
| 7,895,353 B2 | 2/2011 | Jansson |
| 8,401,021 B2 | 3/2013 | Buga et al. |
| 8,457,627 B2 | 6/2013 | Lauer |
| 8,614,951 B2 | 12/2013 | Liu et al. |
| 8,646,010 B2 | 2/2014 | Bengeult et al. |

(Continued)

OTHER PUBLICATIONS

Tao et al. "DVB-S2/DVB-RCS satellite system performance assessment for IFE and ATN aeronautical communications"; 2006 International Workshop on Satellite and Space Communications (Year: 2006).*

(Continued)

*Primary Examiner* — Joseph A Bednash
(74) *Attorney, Agent, or Firm* — Holland & Hart LLP

(57) ABSTRACT

Methods, systems, and devices are described for providing prioritization of real-time data involving forward and return communication links of a vehicle. In embodiments, a multi-user network access terminal serving multiple communication devices on a vehicle via a communication link receives an indication associated with a pre-defined triggering event from a triggering device on a vehicle, identifies real-time data associated with the pre-defined triggering event for transmission via the communication link, prioritizes the real-time data relative to other data associated with the multiple communication devices for transmission via the communication link, and transmits the prioritized real-time data via the communication link. In embodiments, methods, systems, and devices are also described for data prioritization involving network controllers.

34 Claims, 10 Drawing Sheets

(56) References Cited

U.S. PATENT DOCUMENTS

| | | | |
|---|---|---|---|
| 8,682,316 B2 | 3/2014 | Lynch et al. | |
| 8,867,390 B2 | 10/2014 | Chen et al. | |
| 2002/0198473 A1 | 12/2002 | Kumar | |
| 2006/0104299 A1* | 5/2006 | Vazquez Castro | H04L 47/50 |
| | | | 370/412 |
| 2008/0045198 A1* | 2/2008 | Bhogal | G08G 5/0021 |
| | | | 455/414.4 |
| 2010/0020681 A1* | 1/2010 | Nakashima | H04L 47/10 |
| | | | 370/437 |
| 2010/0118769 A1 | 5/2010 | Agarwal | |
| 2010/0260043 A1* | 10/2010 | Kimmich | H04N 19/89 |
| | | | 370/316 |
| 2012/0191273 A1 | 7/2012 | Jacobs et al. | |
| 2013/0135996 A1* | 5/2013 | Torres | H04L 41/5022 |
| | | | 370/230 |
| 2013/0252655 A1 | 9/2013 | Kim | |
| 2015/0131512 A1 | 5/2015 | Lauer et al. | |
| 2018/0095512 A1* | 4/2018 | Artstain | H04W 52/0209 |
| 2018/0270156 A1* | 9/2018 | Keith | H04L 47/56 |

OTHER PUBLICATIONS

Aroumont et al., "Dynamic Radio Resource Management for DVB-RCS systems using FMT at Ka band"; 2009 International Workshop on Satellite and Space Communications (Year: 2009).*

Radzik, et al., *Satellite System Performance Assessment for In-Flight Entertainment and Air Traffic Control*, Space Communications 21, 2007/2008, 14 pgs.

* cited by examiner

RETURN LINK PRIORITIZATION OF SELECTIVE EVENTS ON A MOBILE PLATFORM

CROSS REFERENCE

The present application for patent is a divisional of U.S. patent application Ser. No. 15/484,780 by SULLIVAN, et al., entitled "RETURN LINK PRIORITIZATION OF SELECTIVE EVENTS ON A MOBILE PLATFORM"," filed Apr. 11, 2017, assigned to the assignee hereof and expressly incorporated by reference herein in its entirety.

BACKGROUND

Field of the Disclosure

The present disclosure relates to wireless communications in general, and in particular, to prioritized communications over shared vehicle communication links.

Relevant Background

In typical communications systems used for providing network access service to passengers on vehicles, the demand for communication resources on a forward link to the vehicle can be much greater than the demand for return link resources. This is due to the asymmetry of most passenger network usage. For example, most common network usage for passengers (e.g., streaming video, music, browsing etc.) involves a larger amount of downloading of data from the network to the passengers' mobile devices than uploading data from the passengers' mobile devices to the network. Due to this asymmetry in forward/return link network resource demand, greater communication resources (e.g., data rates) are generally also allocated to the forward link as compared to the return link.

SUMMARY

Methods, systems, and devices for prioritizing real-time data streams associated with one or more particular events over a shared vehicle communication link are described. In some examples, a multi-user network access terminal serving multiple communication devices on an aircraft is configured to receive a pre-defined triggering event from a triggering device. The pre-defined triggering event may be an indication of various events such as a medical or mechanical emergency on the aircraft. From the received pre-defined triggering event, the access terminal may identify real-time data associated with the pre-defined triggering event that is to be transmitted from the aircraft. Due to the real-time data being associated with the pre-defined triggering event, when it is scheduled to be transmitted, it may receive prioritization relative to data from other communication devices on the aircraft that is to be scheduled for transmission. Various techniques of prioritization may be utilized to schedule the real-time data. After the real-time data is prioritized, the access terminal may transmit the data via a communication link on the aircraft. In some embodiments, the transmission of the real-time data may also include an indication that the real-time data is associated with the pre-defined triggering event.

In some examples, a network controller associated with providing network service to the aircraft is configured to receive resource requests for network resources of one or more shared communication links from multi-user network access terminals on multiple aircraft. In receiving a transmission from an aircraft, the network controller may obtain an indication of a triggering event associated with a real-time data stream from a triggering device on the aircraft. Upon obtaining this indication, the network controller may allocate system resources based on predefined data traffic policies. For example, the resource request associated with the real-time data stream associated with the pre-defined triggering event may have prioritized scheduling for resources over the scheduling of the other resource requests from other aircraft. In some embodiments, the network controller may also identify an ensuing real-time data stream generated in response to the identification of the triggering event. The network controller may then transmit the ensuing real-time data stream utilizing at least a portion of the prioritized scheduled resources.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
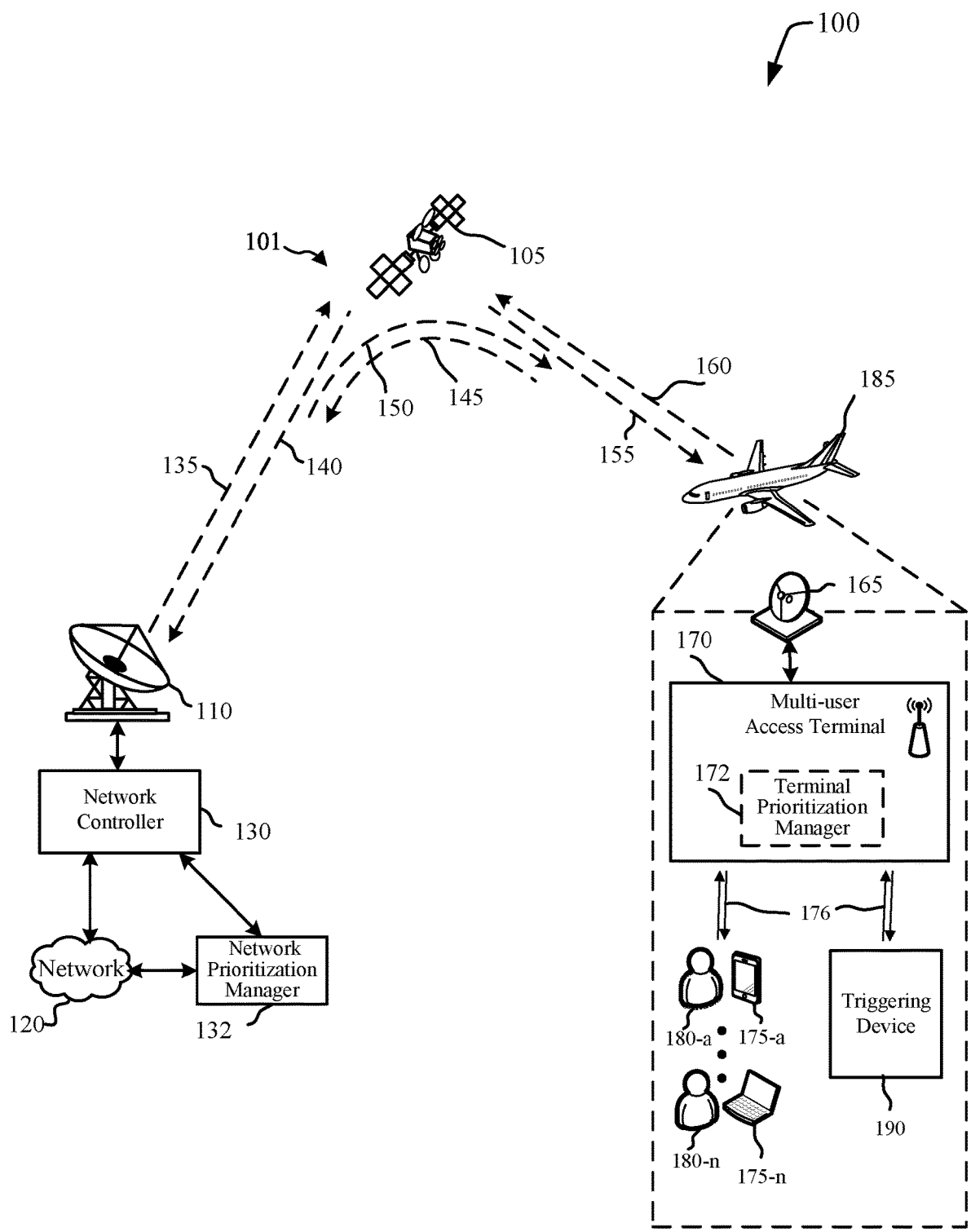
FIG. 1 is a simplified diagram of an example communications system 100 in which the principles included herein may be described.

A commercial aircraft may support a shared communication link for network access service for passengers. For example, users may connect their communication devices to a wireless local area network (WLAN), which routes data communications to other networks (e.g., the Internet) via the shared communication link. The shared communication link may be a wireless link (e.g., cellular link, satellite communication link, etc.), and may be able to support wider bandwidth applications such as video communications. A shared communication link for providing network access service to an aircraft includes a forward link over which data from the ground is delivered to the aircraft, and a return link over which data from the aircraft is delivered to the ground.

Because user traffic for passengers is generally biased heavily in favor of forward link traffic (e.g., streaming video, music, browsing etc.), resources for the shared communication link used to provide network access service for passengers on the aircraft may also be weighted towards the forward link. For example, the forward link may be allocated a greater amount of bandwidth or time resources than the return link. In normal data traffic patterns, the allocated return link resources are generally sufficient to provide users with a satisfactory connectivity experience (e.g., minimal perceived latency, etc.).

However, during certain events there may be a need for a substantial amount of return link communication resources. This may be difficult to ensure due to the constrained return link communication resources and because of other data competing for communication resources of the return link. In the event of a time-critical or emergency situation on the aircraft, providing reliable communications for data associated with the situation may be important in getting ground-based assistance. For example, in an emergency on the vehicle, streaming video communication or real-time data transfer may require a substantial amount of bandwidth in order to ensure that the communication quality is sufficient for addressing the emergency situation. However, because the return link may have relatively fewer allocated resources, congestion of the return link of the shared communication link may impede communications that may be used to respond to the event. For example, the forward link may have sufficient resources for communication of multiple concurrent downstream sessions, while the return link may become congested if one or more upstream video sessions are initiated using return link resources that were allocated to accommodate normal return link traffic patterns.

The described features relate to identifying and prioritizing real-time data streams associated with particular events occurring on-board an aircraft or related to the integrity of the aircraft mechanical systems. In some examples, the described real-time data prioritization enhances emergency communications in situations where a return communication link has more limited resources than a forward communication link. Additionally, described techniques enhance emergency communications carried via the forward communication link. These techniques enable a shared return and/or forward communication link with an aircraft to be utilized effectively for emergency communications. Although discussed in the context of a shared communication link used to provide network access service for an aircraft, the techniques are broadly applicable to any type of vehicle including aircraft, busses, trains, boats, and the like.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

FIG. 1 is a simplified diagram of an example communications system 100 in which the principles included herein may be described. The communications system 100 may provide network access service to users on-board an aircraft 185. The communication service may be provided via a multi-user access terminal 170, to which users may connect via wired (e.g., Ethernet) or wireless (e.g., WLAN) connections 176. The multi-user access terminal 170 may provide the communication service via a forward link connection 150 and a return link connection 145. The communications system 100 is a multiple access system capable of providing network service for multiple aircraft 185 and the network users 180 of each aircraft. The communications system 100 is such that resources (e.g., time, bandwidth, etc.) of the communication links are shared.

Generally, the most common passenger uses of the network access service (e.g., streaming video, music, browsing etc.) are asymmetrically skewed in resource demand to the forward link connection 150. In certain cases, some users may take up a disproportionate share of the system resources of the mobile service, degrading the experience for other users. As a result, these and other issues of providing network access service sometimes results in inconsistent user experiences ranging from good connectivity (e.g., high available data rate) at times to reduced connectivity (e.g., low available data rate) at other times, often within the same session (e.g., the same flight, etc.). Also as a result of these issues, communications associated with emergency conditions such as a medical or mechanical concerns on an aircraft may be hampered if these communications have to share network resources with the multiple aircraft and multiple network users in each aircraft in communications system 100.

The communications system 100 may include any suitable type of satellite system 101, including a geostationary satellite system, medium earth orbit (MEO), or low earth orbit (LEO) satellite system. In one embodiment, the satellite 105 operates in a multi-beam mode, transmitting a number (e.g., typically 20-150, etc.) of spot beams each directed at a different region of the earth. This can allow coverage of a relatively large geographical area and frequency re-use within the covered area. Satellite 105 may provide communication services to aircraft 185 in addition to many other aircraft.

In embodiments, the network controller 130 sends and receives signals to and from the satellite 105 via uplink 135 and downlink 140 using the ground station antenna system 110 (e.g., one or more satellite gateways). The ground station antenna system 110 may be two-way capable and designed with adequate transmit power and receive sensitivity to communicate reliably with the satellite 105. The network controller 130 is connected to the one or more networks 120, which may include any suitable public or private networks and may be connected to other communications networks such as the Internet, telephony networks (e.g., Public Switched Telephone Network (PSTN), etc.), and the like.

The satellite 105 may be a bent-pipe satellite that relays (e.g., with upconversion or downconversion, etc.) information received in uplink signals to corresponding downlink signals to form links between the ground station antenna system 110 and terminals including multi-user access terminal 170. Thus, the uplink 135 from the ground station antenna system 110 to the satellite 105 and the downlink 155 from the satellite 105 form a forward link (FL) 150 while the uplink 160 from the multi-user access terminal 170 (and uplinks from other mobile and fixed access terminals) to the satellite 105 and the downlink 140 from the satellite 105 to the ground station antenna system 110 form a return link (RL) 145. The satellite 105 may be a fixed-beam bent-pipe satellite, switching bent-pipe satellite, beamforming bent-pipe satellite, and the like. The communications for the multi-user access terminal 170 and other terminals may be multiplexed within satellite beams of the uplinks 135, 160 and downlinks 140, 155 using multiplexing techniques such as time-division multiple access (TDMA), frequency-division multiple access (FDMA), multi-frequency time-division multiple access (MF-TDMA), code-division multiple access (CDMA), orthogonal frequency division multiple access (OFDMA), and the like.

Network controller 130 may perform scheduling and resource allocation for forward link 150 and return link 145. For example, network controller 130 may allocate bandwidth and time resources of uplinks 135 and downlink 155 for the forward link 150, and of uplink 160 and downlink 140 for return link 145. Network controller 130 may be coupled via one or more wired or wireless links to a network prioritization manager 132, which may be coupled with the one or more networks 120. Network prioritization manager 132 may be utilized by network controller 130 when one or more data streams to be transmitted via forward link 150 and/or return link 145 have been prioritized relative to one or more other data streams. In one embodiment, network prioritization manager 132 may schedule resources via one or more shared communication links of forward link 150 for the one or more prioritized data streams prior to scheduling resources for the one or more other data streams.

In another embodiment, aircraft 185 may communicate through an air-to-ground service via a network of ground network towers (not shown). The aircraft may use antenna 165 or a specialized air-to-ground (ATG) antenna to transmit and receive data via this technique. The ATG antenna may be configured to use the appropriate ATG radio frequency spectrum allocated in any country. Data is transmitted via one or more forward links and one or more return links associated with the air-to-ground service. Ground network towers may be communicatively linked to various network controllers. The network controllers may be connected to the one or more networks 120, which may include any suitable public or private networks and may be connected to other communications networks such as the Internet, telephony networks (e.g., Public Switched Telephone Network (PSTN), etc.), and the like.

The multi-user access terminal 170 may use an antenna 165 to communicate signals with the satellite 105 via downlink 155 and uplink 160. The antenna 165 may be mounted to an elevation and azimuth gimbal which points the antenna 165 (e.g., actively tracking) at satellite 105. The communications system 100 may operate in the International Telecommunications Union (ITU) Ku, K, or Ka-bands (for example from 17.7 to 21.2 Giga-Hertz (GHz) in the downlink and 27.5 to 31 GHz in the uplink portion of the Ka-band). Alternatively, communications system 100 may operate in other frequency bands such as C-band, X-band, S-band, L-band, and the like. Multi-user access terminal 170 and antenna 165 are mounted on an aircraft 185.

In communication system 100, mobile users 180-*a* to 180-*n* may utilize the network access service via mobile devices 175. Each mobile user 180-*a* to 180-*n* may be provided service on the communication system 100 by connecting (e.g., via a wired or wireless connection) using a mobile device 175 (e.g., a desktop computer, a laptop, a set-top box, a smartphone, a tablet, an Internet-enabled television, and the like). As illustrated in FIG. 1, mobile devices 175-*a* to 175-*n* are connected via wired or wireless connections 176 (e.g., Wi-Fi, Ethernet, etc.) to multi-user access terminal 170. Multi-user access terminal 170 may receive data from via a forward link 150 and transmit data via a return link 145. While communication system 100 is illustrated providing mobile network access service to mobile users 180 aboard aircraft 185, it can be appreciated that the principles described herein for providing network access service to mobile users may be provided using mobile terminals positioned in fixed locations or on various modes of transportation where multiple mobile users may desire network access via communications system 100 (e.g., trains, boats, busses, etc.).

Triggering device 190 is also connected via wired or wireless connections (e.g., Wi-Fi, Ethernet, etc.) to multi-user access terminal 170. Triggering device 190 can be a variety of different devices including desktop computers, laptops, set-top boxes, smartphones, tablets, Internet-enabled televisions, a Health Insurance Portability and Accountability Act (HIPAA) compliant computing device, a computing device with a HIPAA compliant application installed on the device, or a device such as a sensor that automatically monitors the physical state of one or more systems (e.g., fuel systems, power systems, engines, flight control, etc.) on the aircraft 185. Among other things, HIPAA mandates industry-wide standards for health care information and other processes, which may include types of authentication and/or authorization for exchanging medical information.

Multi-user access terminal 170 may detect from triggering device 190 that a pre-defined triggering event has occurred. These triggering events may stem from a number of different actions such as the activation of a triggering device 190 adapted to be a HIPAA compliant computing device, the activation of a HIPAA compliant application on the triggering device 190, or that triggering device 190 has detected a mechanical abnormality of equipment of aircraft 185 or an emergency state for the aircraft. For example, the triggering device 190 may include or be coupled with sensors that are attached to components of an aircraft that are vital for flight and if a sensor indicates that a particular vital component is malfunctioning, the triggering device 190 may detect the triggering event. The triggering device 190 may store signatures of various triggering events that have been previously identified as being associated with a corresponding real-time data stream for which it is important to prioritize over other data. If incoming data to the triggering device 190 or an identified condition (e.g., power-on of the triggering device, input to the triggering device 190, etc.) occurs, the triggering device 190 indicates the detection of the triggering event to the multi-user access terminal 170. In other examples, the multi-user access terminal 170 may store signatures of various triggering events and identify the triggering event based on a real-time data stream from the triggering device 190 matching one of the signatures. For example, the signatures detected by the multi-user access terminal 170 may include receiving data from a particular IP address, detecting a particular packet header, etc.

The pre-defined triggering event may be automatically or manually initialized according to various signatures. For example, automatic initialization may occur when the triggering device 190 or a particular application on the triggering device 190 is powered on or initialized. Manual initialization may occur when a user inputs a certain key, presses or operates a physical control or button, or any other control that requires a user to physically input additional information into the triggering device 190. The pre-defined trigger of the triggering event may include an identifier that multi-user access terminal 170 recognizes as corresponding to a data stream that may be important to prioritize over other data. The identifier may correspond to a general triggering event or there may be a unique identifier corresponding to different triggering events (e.g., powering on HIPAA device, activation of HIPAA application, mechanical abnormality, etc.).

Additionally, a user may be required to authorize transmission of the pre-defined triggering event to multi-user access terminal 170 via a HIPAA compliant authorization procedure. Triggering device 190 may be required to verify the user through the HIPAA compliant authorization procedure before transmitting the pre-defined triggering event. Verification of the user may involve determining whether the user of the triggering device 190 is authorized to access the device. For example, use of the triggering device 190 may be restricted to airline staff or a certified physician. Verification may also involve obtaining consent from a patient seeking treatment from an airline staff member or a certified physician.

The multi-user access terminal 170 may include a terminal prioritization manager 172. Upon receiving an indication of a pre-defined triggering event from triggering device 190, terminal prioritization manager 172 identifies real-time RL data from triggering device 190 associated with the pre-defined triggering event for transmission from aircraft 185. Real-time may be understood as there being no significant delay between the occurrence of an event (various user interactions with the triggering device 190) and the use of the processed data. Real-time data includes, for example, video or audio communications between live parties, navigation data, or data used to make decisions by a recipient as an event is happening. In some instances, once terminal prioritization manager 172 identifies the pre-defined triggering event from triggering device 190, terminal prioritization manager 172 may be able to associate a device identifier with triggering device 190 such as its MAC address, its unique device identifier (UDID), etc. Once triggering device 190 can be identified, real-time RL data from triggering device 190 may be identified. The real-time RL data may include one or any combination of the following: video teleconference data, biometric data, flight recorder data, messaging data, and flight status information. Terminal prioritization manager 172 then prioritizes this real-time RL data relative to other data associated with other multiple communication devices, such as mobile devices 175, for transmission to satellite 105 via return link 160 or ground network towers 125 via return link 145. Terminal prioritization manager 172 may also ensure that the real-time RL data is HIPAA compliant in information encryption. A resource request for return link resources of a chosen communication link (e.g., return links 145) may be transmitted along with an indication that the real-time RL data is associated with the pre-defined triggering event. Additionally, prioritized FL data associated with the transmitted real-time data may be received via forwards links 150.

The multi-user access terminal 170 may utilize different communication protocols for transmitting the real-time RL data that is associated with the pre-defined triggering event and other data not associated with the pre-defined triggering event. For example, two types of Internet Protocol (IP) traffic may include user datagram protocol (UDP) and transmission control protocol (TCP). UDP is suitable for applications that need fast, efficient transmission such as games or video streams. UDP is generally a faster means for transmission because there is no re-transmission mechanism for packets for which transmission error occurs. TCP is suitable for applications that require high reliability and where transmission time is relatively less critical. In this instance, multi-user access terminal 170 may decide to send data not associated with the pre-defined triggering event via UDP, but it may decide to send real-time data that is associated with the pre-defined triggering event via TCP and may, for example, encapsulate UDP packets within TCP packets for transmission via the shared link. This error checking of real-time RL data associated with the pre-defined triggering may ensure the reliable delivery of important data. In some cases such as real-time video streaming, packet latency for re-transmission may mean that retransmitted packets do not arrive in time for real-time display at the destination. However, it may be useful to have a higher integrity data stream stored, and the destination may be able to insert any retransmitted packets into the stored data stream for later review, thus increasing the fidelity of the stored information where an investigation or other review is warranted. Thus, multi-user access terminal 170 may, for example, encapsulate a UDP stream into a TCP stream for transmission to the network controller 130, and the UDP stream may be prioritized over TCP re-transmissions to ensure real-time data flow of the UDP stream. The network controller 130 may split the stream into both UDP and TCP streams. In one example, RL traffic associated with the stream may be split into a UDP stream for live viewing and a TCP stream for storage and later analysis.

Figure 2:
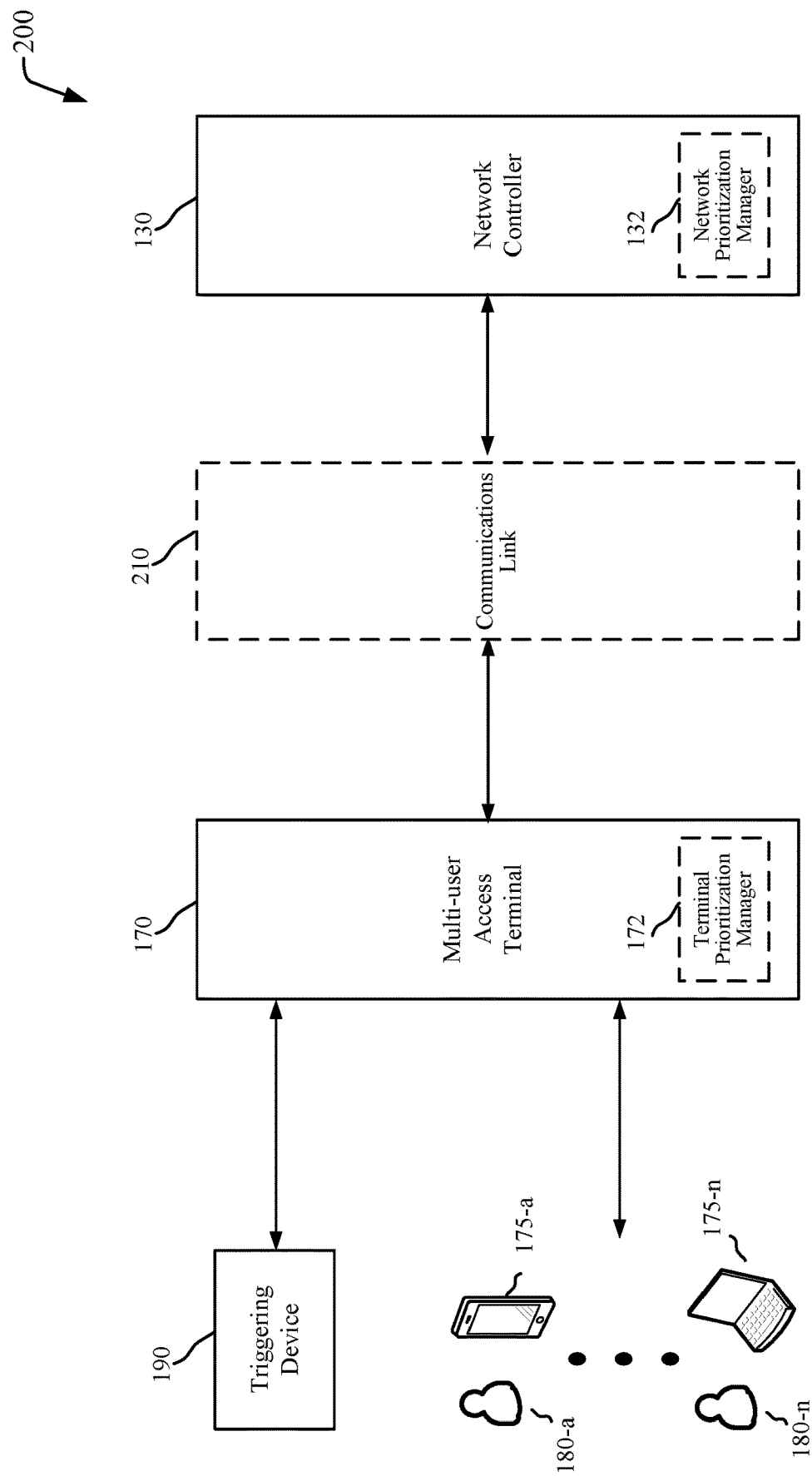
FIG. 2 is a simplified diagram illustrating aspects of providing return and forward link prioritization for real-time data associated with a pre-defined triggering event.

FIG. 2 is a simplified diagram illustrating aspects of providing return and forward link prioritization for real-time data associated with a pre-defined triggering event. Diagram 200 illustrates communication between triggering device 190, mobile devices 175, multi-user access terminal 170, terminal prioritization manager 172, communication link 210, network controller 130, and network prioritization manager 132. In FIG. 2, triggering device 190 and mobile devices 175 (associated with mobile users 180) are communicatively connected via wired or wireless connections to multi-user access terminal 170 for network access service. Triggering device 190 may be devices such as those listed above and also devices such as communication devices in the cockpit, aircraft diagnostic devices, and the like. Multi-user access terminal 170 may support various operations associated with serving multiple users 180 via the shared forward and return links. For example, multi-user access terminal 170 may perform network address translation (NAT) services, firewall services, and the like. In addition, multi-user access terminal 170 may employ data acceleration techniques (e.g., TCP acceleration) for some types of forward and/or return links.

Under normal operation (e.g., in the absence of a pre-defined triggering event), multi-user access terminal 170 may support network access service for users 180 according to user or device specific traffic policies. For example, multi-user access terminal 170 may employ queuing, suppression of some traffic types (e.g., HD video, etc.), data prioritization (e.g., prioritization of latency-critical data types over other data types) return-link traffic shaping (e.g., delaying and/or dropping packets to conform a data stream to a desired traffic profile). Each of the mobile devices 175 may support multiple sessions (e.g., associated with different applications, etc.), and each session may include packets associated with one or more packet data types. Multi-user access terminal 170 may identify packets associated with a particular session of a mobile device 175 based on the source address, destination address, type of service (which also may be known as quality of service (QoS)), or transport protocol parameters.

Multi-user access terminal 170 may receive RL packets from mobile devices 175 associated with various sessions and perform RL traffic shaping, prioritization, and scheduling of RL transmissions over communication link 210. For example, multi-user access terminal 170 may request resources of communication link 210 from network controller 130 for transmission of the RL packets, where the requested resources may be based on the amount of RL packets currently in a packet queue for transmission. The multi-user access terminal 170 may request resources for all of the currently queued packets, or a subset of the currently queued packets (e.g., packets that are within a given information rate to each of the mobile devices 175). Based on requests from multiple multi-user access terminals (e.g., on different planes), the network controller 130 may allocate a set of resources to multi-user access terminal 170, which may be less than the amount of resources requested by multi-user access terminal 170 where the shared resources of the RL of communication link 210 are congested. Prioritization of the RL packets may generally be provided based on the QoS, protocol (e.g., TCP, UDP, etc.), or time in the queue of the packets. For example, prioritization may favor packets that have been in the packet queue longer or packets with a QoS and/or protocol that indicates higher time sensitivity. Multi-user access terminal 170 may receive FL packets for mobile devices 175 over communication link 210 and forward the FL packets to the mobile device 175.

While managing communications between the mobile devices 175 and the network controller 130, the multi-user access terminal 170 may identify a pre-defined triggering event from triggering device 190. For example, multi-user access terminal 170 may receive an access sign-on from triggering device 190 or identify communications opening a session between the triggering device 190 and a network communicatively coupled (e.g., via the Internet) with network controller 130. Terminal prioritization manager 172 then identifies real-time RL data from triggering device 190 associated with the pre-defined triggering event for transmission.

Terminal prioritization manager 172 then prioritizes this real-time RL data relative to other RL data associated with the communication devices, such as mobile devices 175. Terminal prioritization manager 172 may utilize a number of different methods in prioritizing the real-time RL data from remote terminal 190 such as placing the data at the top of a transmission queue, provisioning a minimum data rate for the real-time RL data, suppression of traffic shaping, or reducing data rates for other RL data streams associated with mobile devices 175. Terminal prioritization manager 172 may utilize one or a combination of these techniques in order to achieve a satisfactory communication rate for the prioritized real-time RL data.

Once the prioritized real-time RL data has been scheduled, the data is transmitted through communication link 210 which may be a communication link of satellite system 101 or air-to-ground service 102. In transmitting the data, communication link 210 utilizes the techniques described above.

The prioritized real-time RL data is received via the communication link 210 by the network controller 130. In some embodiments, the network controller 130 identifies that the prioritized real-time RL data is associated with the triggering event that occurred on aircraft 185. For example, prioritized real-time RL data that is associated with the triggering event may have a specialized header in the data packets that the network controller 130 recognizes as being associated with a triggering event.

In some embodiments, the network controller 130 prioritizes allocation of RL resources to the multi-user access terminal 170. For example, the multi-user access terminal 170 may send an indicator in a RL resource request that indicates the presence of the prioritized real-time RL data. For example, the RL resource request may contain separate requested amounts of resources for prioritized real-time RL data and one or more QoS levels. The network controller 130 may then prioritize allocation of RL resources to the multi-user access terminal 170 for transmission of the prioritized real-time RL data. For example, the network controller 130 may allocate RL resources in a grant of RL resources to the multi-user access terminal 170 for transmission of the prioritized real-time RL data prior to allocating RL resources to other terminals (e.g., other multi-user access terminals, etc.). In one example, the multi-user access terminal 170 is being serviced via a satellite beam of a satellite system 101, and RL resources within the satellite beam are constrained (e.g., oversubscribed by resource requests). The network controller 130 may allocate RL resources of the satellite beam to all multi-user access terminals 170 having prioritized real-time RL data for transmission in at least the amounts requested by the multi-user access terminals 170 having prioritized real-time RL data in an initial allocation step. Then the network controller 130 may allocate the remaining RL resources of the satellite beam to each terminal according to, for example, QoS levels. This may result, for example, in scaling of allocated RL resources for all non-prioritized RL data requests by a certain factor, while allocations associated with requests for prioritized real-time RL data are not scaled. The resources allocated to the multi-user access terminal 170 will therefore be the sum of the resources allocated for the prioritized real-time RL data (not scaled) and the resources allocated for non-prioritized RL data requests (scaled). Although the network controller 130 may not specify the use of allocated resources for a given multi-user access terminal 170, the multi-user access terminals 170 having prioritized real-time RL data will prioritize transmission of the prioritized real-time RL data, leaving the remainder of the allocated resources to be used for transmission of non-prioritized RL data.

In some embodiments, the network controller 130 may receive ensuing real-time FL data associated with the prioritized return real-time RL data. This ensuing real-time FL data may be one or a combination of video teleconference data, biometric data, messaging data, and aircraft diagnostic communications.

This real-time FL data may be received by the network controller 130 in conjunction with other FL data (e.g., for transmission to other multi-user access terminals etc.). This ensuing real-time FL data is then prioritized for transmission to the multi-user access terminal 170 over communication link 210 relative to the other FL data. For example, the network controller 130 may perform traffic shaping on FL data associated with the mobile devices 175. Additionally, the network controller 130 may prioritize the ensuing real-time FL data over FL data associated with multi-user network access terminals on other aircraft that may share the same communication link (e.g., satellite beam) with the aircraft associated with the triggering device 190. Prioritization techniques may include resource prioritization, traffic management prioritization, and packet-level prioritization. For example, prioritization techniques include traffic shaping, increasing bandwidth, increasing the number of time slots, or queue prioritization. The prioritization techniques may depend on the channel access method used (e.g., increasing the number of time slots for TDMA, increasing the number of carriers for FDMA, etc.). Multi-user access terminal 170 then receives the ensuing real-time FL data from communication link 210 and then sends it to triggering device 190.

Figure 3:
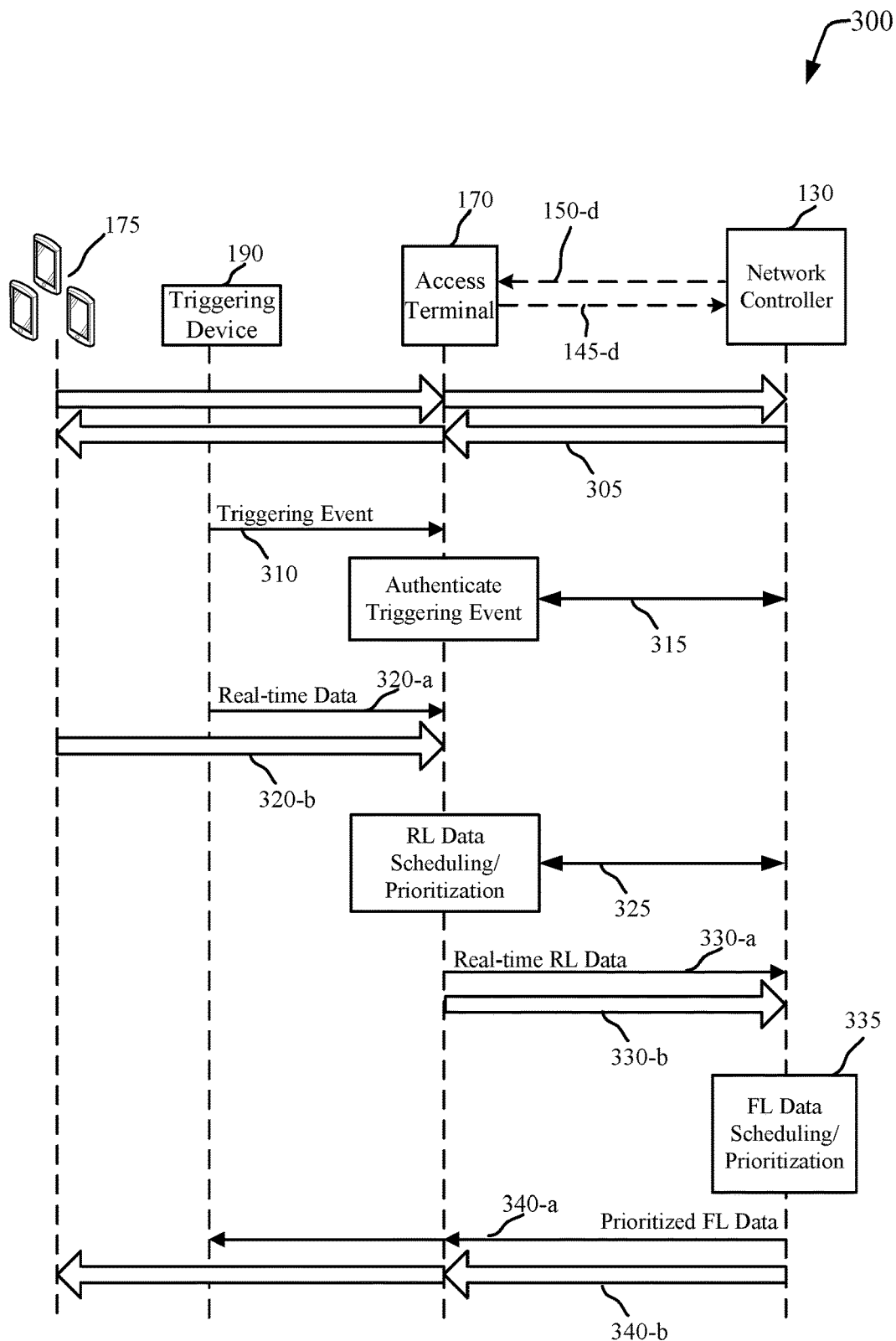
FIG. 3 is a flow diagram of an example communication flow for providing return and forward link prioritization for real-time data associated with a pre-defined triggering event with various aspects of the disclosure.

FIG. 3 is a flow diagram 300 of an example communication flow for providing return and forward link prioritization for real-time data associated with a pre-defined triggering event in accordance with various aspects of the disclosure. Flow diagram 300 illustrates communication flow between mobile devices 175, triggering device 190, multi-user access terminal 170, and network controller 130. Multi-user access terminal 170 and network controller 130 may communicate via forward link 150-*d* and return link 145-*d* using techniques described in FIG. 1. Mobile devices 175, triggering device 190, multi-user access terminal 170, and network controller 130 may be examples of the devices illustrated in FIGS. 1 and 2.

Step 305 represents general communications between the devices described above (i.e., in the absence of a pre-defined triggering event). Triggering device 190 at some time may initiate a triggering event 310 which is identified by multi-user access terminal 170. These triggering events may stem from a number of different actions such as the activation of a triggering device 190 adapted to be a HIPAA compliant computing device, the activation of a HIPAA compliant application on the triggering device 190, or that triggering device 190 has detected a mechanical abnormality of equipment of aircraft 185 or an emergency state for the aircraft. Triggering event 310 may be identified through various techniques such as recognizing a specialized header in the data packets sent from triggering device 190, receiving data communications from a specific IP address, receiving data from a predetermined device, detection of opening of a session with a specific IP address, etc.). In some examples, multi-user access terminal 170 may authenticate the triggering event. This authentication may be in the form of verification of the user who may have initiated the triggering event 310. Verification of the user may occur at the multi-user access terminal 170 or the multi-user access terminal 170 may enter into an authentication procedure 315 with network controller 130. This authentication procedure 315 may involve determining whether the user of the triggering device 190 is authorized to access the device. For example, use of the triggering device 190 may be restricted to airline staff or a certified physician. Verification procedure 315 may also be a HIPAA compliant authorization procedure.

Upon successful authentication, multi-user access terminal 170 may then receive real-time data 320-*a* from triggering device 190 for transmission via return link 145-*d*. Multi-user access terminal 170 may also receive RL data 320-*b* from one or more mobile devices 175 for transmission via return link 145-*d*. Upon the receipt of RL data 320-*a* and 320-*b*, multi-user access terminal may prioritize real-time RL data 320-*a* relative to RL data 320-*b*. Multi-user access terminal 170 may then perform RL resource scheduling and/or prioritization in step 325. Multi-user access terminal 170 may also communicate with network controller 130 in order to carry out RL resource scheduling/prioritization in step 325. For example, the multi-user access terminal 170 may make resource requests or indicate an amount of data it has to send to the network controller 130. The network controller 130 may then allocate RL resources of carriers used for return link transmissions in resource grants. These grants may be increased bandwidth or a greater number of time slots for prioritized return link data relative to RL data 320-*b*. Multi-user access terminal 170 may prioritize the data or schedule RL resources in a variety of ways including scheduling the real-time data 320-*a* prior to scheduling other data. For example, the real-time data 320-*a* may be placed at the top of a transmission queue or in a separate transmission queue that is cleared prior to other transmission queues associated with non-prioritized data, provisioning a minimum data rate for the real-time RL data 320-*a*, or reducing a data rate associated with the other data of at least one of the communication devices (e.g., data 320-*b*) for transmission via the communication link. One or more of these techniques may be used in conjunction with each other.

After the real-time RL data 320-*a* from triggering device 190 has been scheduled by multi-user access terminal 170 and RL resources have been appropriated, multi-user access terminal 170 may then transmit the real-time RL data 320-*a* to network controller 130 in data transmission 330-*a* utilizing a portion or all of the allocated RL resources. Additionally, multi-user access terminal 170 may transmit portions of RL data 320-*b* in data transmission 330-*b* using portions of the allocated RL resources. Network controller 130 may receive the real-time RL data 320-*a* via data transmission 330-*a* and identify it as prioritized data. This identification may have been facilitated in RL data scheduling step 325, or network controller 130 may identify it as prioritized data through some characteristic of the data (e.g., a specialized header in the data packets that the network controller 130 recognizes as being associated with a triggering event).

After network controller 130 identifies real-time RL data 330-*a* as data associated with the pre-defined triggering event, network controller 130 may subsequently receive ensuing real-time FL data that is associated with real-time RL data 320-*a* (e.g., associated with a same session, etc.). This ensuing real-time FL data, for example, may be video teleconference data, biometric data, messaging data, and/or aircraft diagnostic communications, that may be generated in response to real-time RL data 320-*a*. Upon receipt of the ensuing real-time FL data, network controller 130 may prioritize the ensuing real-time FL data relative to all other FL data that is to be transmitted to various other aircraft and schedule FL resources for the ensuing FL data's timely transmission at step 335. Prioritization techniques may include resource prioritization, traffic management prioritization, and packet-level prioritization. Resource prioritization includes prioritization of resources allocated to the multi-user access terminal 170 associated with the triggering device (e.g., increasing allocated bandwidth, increasing the number of allocated time slots, etc.). The resource prioritization techniques may depend on the channel access method used (e.g., increasing a number of time slots for TDMA, increasing a number of carriers for FDMA, etc.). Traffic management prioritization techniques include traffic shaping of FL data associated with other communication devices (on the same or different aircraft) apart from the triggering device on the aircraft. Traffic management prioritization techniques may be used to reduce the apparent impact other data streams of prioritization by, for example, reducing video streaming quality but limiting the need for buffering or other disruptions. Packet-level prioritization includes prioritizing the queuing of the ensuing real-time FL data for transmission on a forward link utilizing scheduled resources of one or more shared communication links to the aircraft that generated real-time RL data 320-*a*.

Network controller 130 may transmit prioritized FL data 340-*a* (i.e., the ensuing real-time data stream) to multi-user access terminal 170, which may then forward the data to triggering device 190. An example application of prioritized real-time FL data may include a virtual co-pilot application where data emanating from a pilot on the ground associated with the application would receive prioritized FL resource allocation over data that is not prioritized. Examples of data emanating from the virtual co-pilot application may include streaming video between the pilot on the ground and a pilot in an aircraft, flight commands from the pilot on the ground, etc. Another example of prioritized real-time FL data may include streaming video and/or data from a doctor on the ground to a patient or caregiver on the plane. The doctor may, for example, provide instructions for the patient or caregiver via the real-time video session, or control a medical instrument (e.g., to control pain medication dosage or a defibrillator, etc.). Subject to the priority of FL data 340-*a* (e.g., a queue associated with FL data 340-*a* being cleared first, etc.), network controller 130 may also send data 340-*b* (i.e., non-prioritized data) on the forward link to multi-user access terminal 170 which may then forward the data 340-*b* to mobile devices 175.

Figure 4:
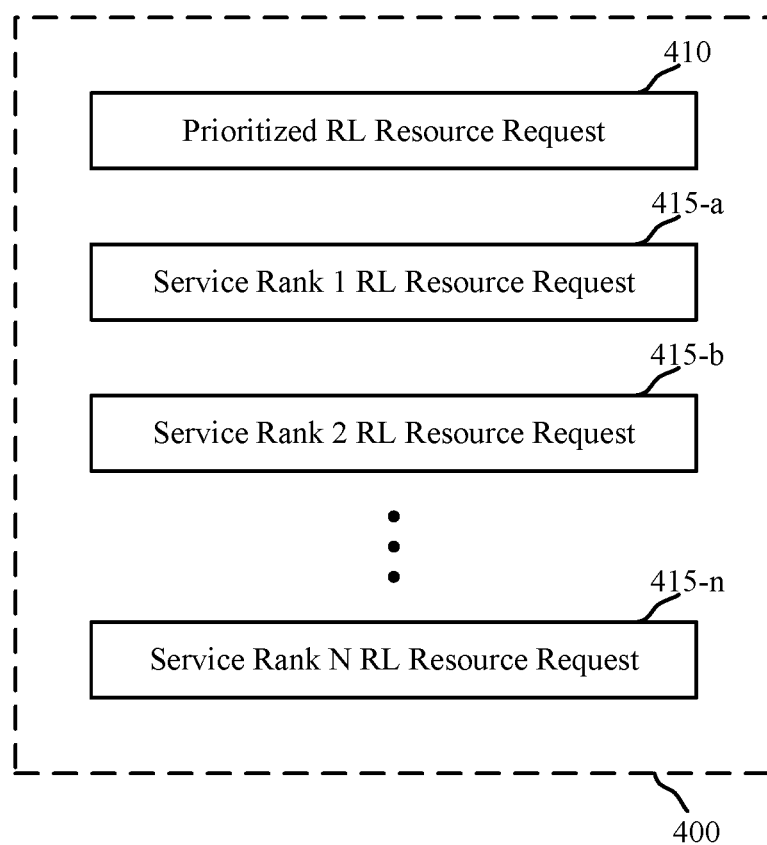
FIG. 4 is a block diagram illustrating an example of a priority queue in accordance with various aspects of the disclosure.

FIG. 4 is a block diagram illustrating an example of a return link resource request 400 supporting prioritized resource requests, in accordance with various aspects of the disclosure. Return link resource request 400 may illustrate RL resource requests sent by multi-user access terminal 170 in RL data scheduling/prioritization 325 as shown in FIG. 3.

Return link resource request 400 may include prioritized RL resource request 410, service rank 1 RL resource request 415-*a*, service rank 2 RL resource request 415-*b*, and service rank n RL resource request 415-*n*. Prioritized RL resource request 410 requests may indicate an amount of data or a data rate requested for prioritized data (e.g., prioritized data 320-*a* of FIG. 3, etc.). Prioritized RL resource request 410 may indicate that each of the service rank resource requests 415 may indicate an amount of data or a data rate associated with a particular service rank. Each service rank may be determined according to various factors of data in queues at the multi-user access terminal 170 including service levels for mobile devices 175, time data has been in the queue, QoS level for data in the queue, protocol type, and the like. For example, service rank 1 RL resource request 415-*a* may be associated with an amount of data that is associated with data rates within a committed information rate (CIR) for the requesting mobile devices 175 having been in a queue for longer than a predetermined time period, while service rank 2 RL resource request 415-*a* may be associated with an amount of data within the CIR but not having been in the queue for longer than the predetermined time period. Other service rank resource requests may be associated with other combinations of the service rank factors given above. Thus, the prioritized RL resource request 410 may be sent as a separate resource request from other resource requests that are prioritized based on the service rank factors.

Upon receipt of return link resource request 400, a network controller 130 may allocate return link resources to the multi-user access terminal 170. The network controller 130 may allocate resources to support the prioritized RL resource request 410 prior to allocating resources to service rank 1 to N RL resource requests 415 of return link resource request 400, or to service rank 1 to N RL resource requests 415 from other terminals (e.g., other multi-user access terminal 170, fixed terminals, etc.). The network controller 130 may send grants of RL resources to the multi-user access terminal 170 and other supported terminals based on the allocations. These grants may include increased bandwidth or a greater number of time slots for prioritized return link data relative to other return link data associated with service rank 1 to N RL resource requests 415 from the multi-user access terminal 170 and other terminals. Network controller 130 may also pre-allocate FL resources based on prioritized RL resource request 410 to, for example, provide sufficient FL resources for ensuing real-time FL data expected in response to real-time RL data (e.g., at a same or similar data rate, etc.).

Figure 5:
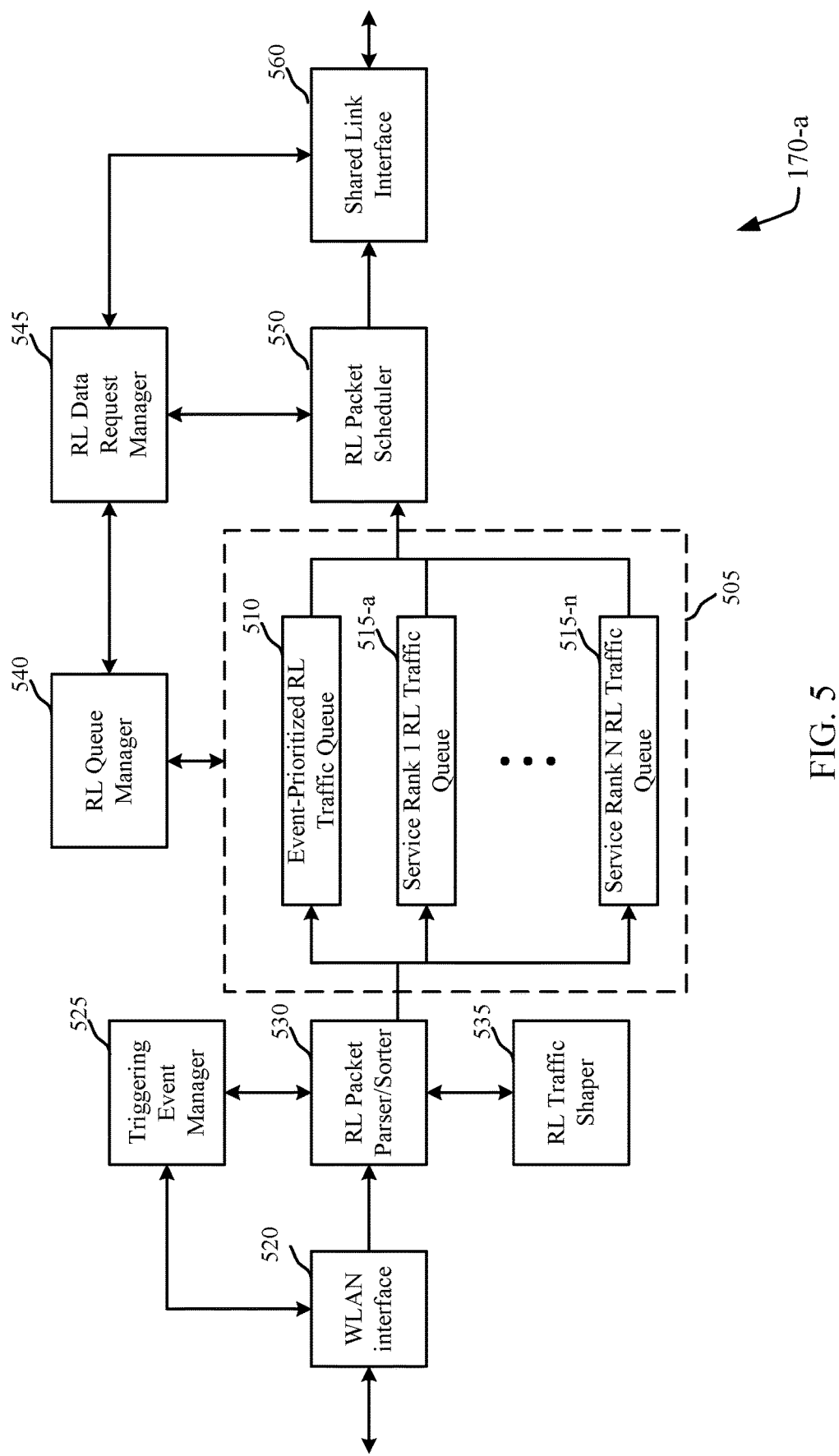
FIG. 5 is a block diagram illustrating an example of a terminal prioritization manager in accordance with various aspects of the disclosure.

FIG. 5 is a block diagram illustrating an example of a multi-user access terminal 170-*a* in accordance with various aspects of the disclosure. Multi-user access terminal 170-*a* may be an example of the multi-user access terminals 170 described with reference to FIGS. 1-2. Multi-user access terminal 170-*a* may include RL data queue stack 505, WLAN interface 520, triggering event manager 525, RL packet parser/sorter 530, RL traffic shaper 535, RL queue manager 540, RL data request manager 545, RL packet scheduler 550, shared link interface 560. Each of these components may be communicatively coupled to each other.

WLAN interface 520 may receive return link data from a number of devices, including mobile devices 175 and triggering device 190. WLAN interface 520 may forward this data to triggering event manager 525 and RL packet parser/sorter 530. Triggering event manager 525 may identify if at least a portion of the received data is associated with a pre-determined triggering event. For example, triggering event manager 525 may store signatures of various pre-defined triggering events and identify that a triggering event has occurred when the received data matches one of the signatures. The signatures may include, for example, the received data coming from the triggering device 190, information in a packet header, or a combination of data coming from multiple sources. Additionally or alternatively, triggering event manager 525 may identify an indication of a triggering event from a triggering device 190. If a particular packet of data is associated with a pre-determined triggering event, it may notify packet parser/sorter 530.

RL packet parser/sorter 530 may receive data from WLAN interface 520 and place the data into the appropriate data queues. RL traffic shaper 535 may provide traffic management techniques to RL packet parser/sorter 530 in order to bring the data into compliance with a desired traffic profile and optimize performance. RL traffic shaper 535 may use techniques such as rate-limiting data sessions according to various QoS or user service levels, levels of congestion, and/or presence of data associated with predefined triggering events. For example, where triggering event manager 525 indicates that a triggering event has occurred, RL traffic shaper 535 reduce a data rate associated with other RL data streams from mobile devices 175 based on detection of the triggering event, RL resources allocated to the multi-user access terminal 170-*a*, or queue status. RL packet parser/sorter 530 may forward its sorted data to RL data queue stack 505. RL data queue stack 505 stores the data received from RL packet parser/sorter 530. RL packet parser/sorter 530 may store the data in RL data queue stack 505 with regards to its priority/service rank. For example, RL packet parser/sorter 530 may place the real-time RL data associated with a triggering event in event-prioritized RL traffic queue 510. RL packet parser/sorter 530 may place other packets of RL data in corresponding queues such as service rank 1 RL traffic queue 515-a and service rank n RL traffic queue 515-n. Event-prioritized RL traffic queue 510 may receive a guaranteed minimum QoS or transmission rate while lower priority data packets in other queues may receive lesser transmission guarantees and quality. Return link queue manager 540 may continuously manage the service ranks accorded to the data contained within RL data queue stack 505 (e.g., moving data from one service rank queue to another based on time in the queue, etc.).

RL data request manager 545 may coordinate data in RL data queue stack 505 for transmission on the return link. It may receive information from queue manager 540 as to the status of the prioritized traffic queue 510 and service rank queues 515. RL data request manager 545 may transmit RL resource requests that include a separate resource request indicating the status (e.g., amount of data, etc.) in event-prioritized RL traffic queue 510. Upon receipt of an indication of allocated RL resources for a transmission, RL packet scheduler 550 may schedule packets in event-prioritized RL traffic queue 510 before other packets (e.g., packets in service rank RL traffic queues 515). Where additional RL resources are present, packet scheduler 550 may schedule additional packets for transmission using the allocated RL resources according to the service rank of the packets (e.g., service rank 1 packets prioritized over service rank 2 packets, etc.). Shared link interface 560 may then transmit the aggregated data in an RL transmission from the aircraft (e.g., via a modem and antenna).

Figure 6:
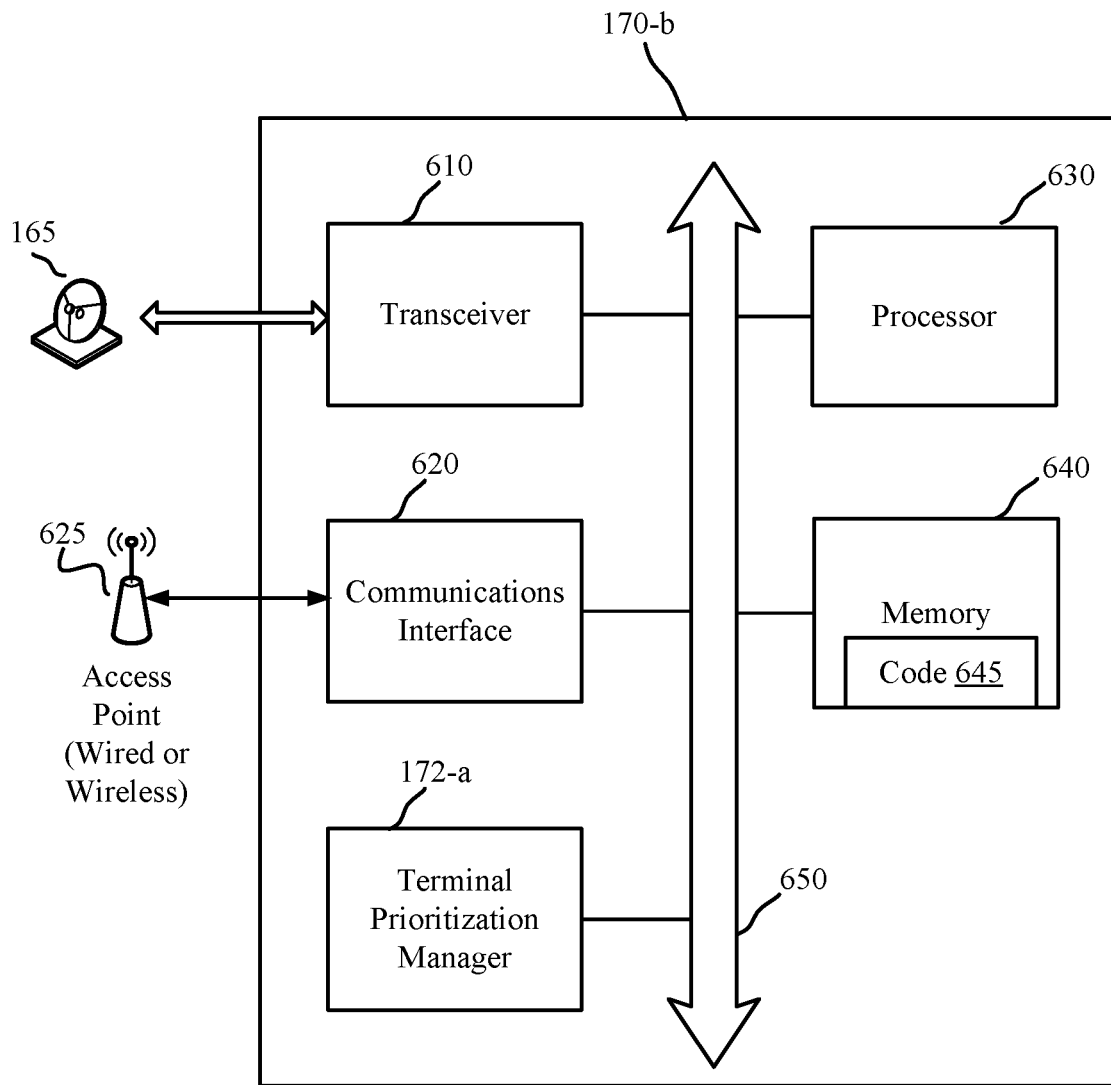
FIG. 6 is a block diagram illustrating an example of a multi-user access terminal in accordance with various aspects of the disclosure.

FIG. 6 is a block diagram illustrating an example of a multi-user access terminal 170-b in accordance with various aspects of the disclosure. The multi-user access terminal 170-b may be an example of the multi-user access terminals 170 described with reference to FIG. 1-3 or 5. The multi-user access terminal 170-b may include a modem 610, communications interface 620, access point 625, terminal prioritization manager 172-a, processor 630, memory 640, software code 645, and bus 650.

Transceiver 610 manages communications between the multi-user access terminal 170-b and satellite(s) 105 and/or ground network towers 125 via antenna 165. The transceiver 610 may communicate bi-directionally, via one or more antennas, as described above. The transceiver 610 may also include a modem to modulate the packets and provide the modulated packets to the antennas for transmission, and to demodulate packets received via the antennas. Transceiver 610 may be configured to communicate with satellite(s) 105 over one or more frequency bands (e.g., Ka, Ku, etc.) and may be configured to automatically orient antenna 165 to transmit signals to and receive signals from satellite(s) 105 even when mobile (e.g., mounted on an airplane, boat, etc.). Transceiver 610 may also be configured to communicate with ground network towers 125 over one or more frequency bands allocated to ATG communication using an appropriate ATG antenna (not shown).

Communications interface module 620 controls network traffic via access point 625. Communications interface 620 may implement wired network interfaces (e.g., Ethernet, Fibre Channel, etc.) and/or wireless network interfaces (e.g., IEEE 802.11 compliant interfaces, etc.).

Processor module 630 may include an intelligent hardware device, e.g., a central processing unit (CPU), a microcontroller, an ASIC, etc. Processor module 630 may process information received through modem 610 or communications interface 620, or information to be sent to communications interface 620 or modem 610 for transmission. Processor module 630 may handle, alone or in connection with terminal prioritization manager 172, various aspects of prioritizing real-time data associated with a pre-defined triggering event.

Memory 640 may include random access memory (RAM) or read-only memory (ROM). Memory 640 may store computer-readable, computer-executable code 645 containing instructions that are configured to, when executed, cause processor 630 to perform various functions described herein. Alternatively, the code 645 may not be directly executable by processor 630 but be configured to cause the multi-user access terminal 170-b (e.g., when compiled and executed) to perform various of the functions described herein.

Terminal prioritization manager 172-a may, in conjunction with memory 640 and processor 630 perform the functions described above including prioritizing real-time RL data associated with a pre-defined triggering event. For example, terminal prioritization manager 172-a may receive indications associated with pre-defined triggering events from a triggering device, identify real-time RL data associated with the pre-defined triggering events, and prioritize the real-time RL data relative to other RL data associated with mobile devices supported by multi-user access terminal 170-b. Terminal prioritization manager 172-a may implement the functions of various components of FIG. 5 including the triggering event manager 525, RL data request manager 545, RL queue manager 540, or RL data request manager 545.

The components of the multi-user access terminals 170-a or 170-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 7:
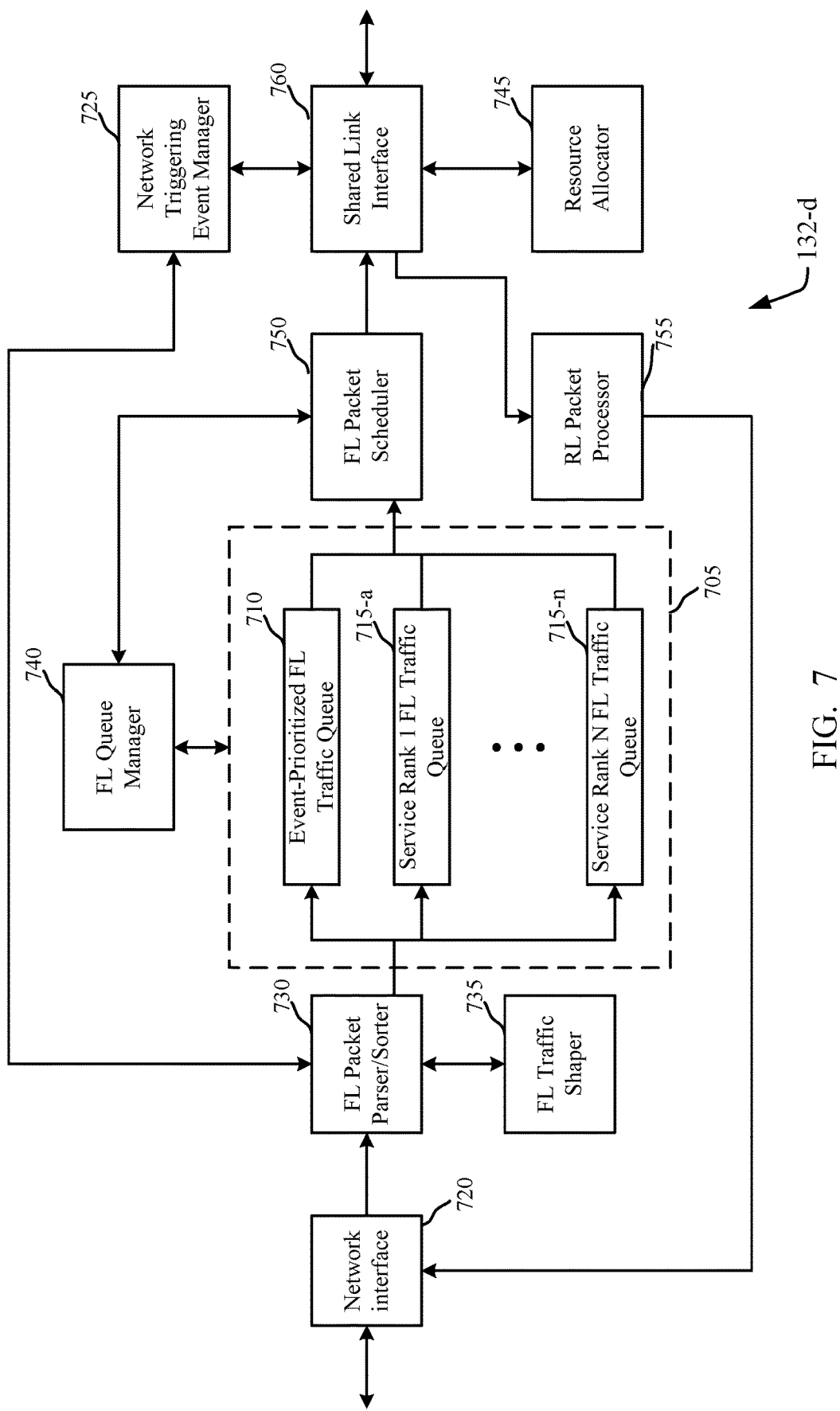
FIG. 7 is a block diagram illustrating an example of a network prioritization manager in accordance with various aspects of the disclosure.

FIG. 7 is a block diagram illustrating an example of a network prioritization manager 132-d in accordance with various aspects of the disclosure. The network prioritization manager 132-d may be an example of the network prioritization managers 132 described with reference to FIGS. 1-3. The network prioritization manager 132-d may include FL data queue stack 705, network interface 720, network triggering event manager 725, FL packet parser/sorter 730, FL traffic shaper 735, FL queue manager 740, RL resource allocator 745, FL packet scheduler 750, and shared link interface 760. Each of these components may be communicatively coupled to each other.

Network triggering event manager 725 may perform functions associated with identifying and authenticating sessions that are associated with triggering events for data prioritization on aircraft. For example, network triggering event manager 725 may receive indications from a multi-user access terminal 170 that a triggering event has occurred on an aircraft. Network triggering event manager 725 may also perform authentication and/or authorization of triggering events and/or access to a triggering device used for emergency communications aboard the aircraft. Network triggering event manager 725 may communicate with other networks (e.g., via network interface 720) to perform authentication and/or authorization for triggering events.

Once a triggering event has been authenticated and/or authorized, network triggering event manager 725 may inform resource allocator 745 to perform prioritized resource allocation of RL resources for the multi-user access terminal 170 associated with the triggering event. Prioritized resource allocation of the RL resources for the multi-user access terminal 170 associated with the triggering event may include prioritizing allocation of RL resources (e.g., resources of one or more shared communication links used for RL communications) to the multi-user access terminal 170 associated with the triggering event over allocation of RL resources to other multi-user access terminal 170 or access terminals not associated with the triggering event. Resource allocator 745 may then allocate RL resources for the respective resource request associated with the aircraft prior to allocating portions of the RL resources to service other resource requests (e.g., other resource requests from the same multi-user access terminal 170, resource requests from other multi-user access terminals 170 on other aircraft, etc.). When RL data packets are received (e.g., including the triggering-event prioritized RL packets) at the shared link interface 760, the RL data packets may be processed by RL packet processor 755 and passed to the network interface 720 for sending to a destination.

Network interface 720 may receive FL packet data for transmission over a communications system (e.g., the communications system 100 of FIG. 1). Network interface 720 may send this FL data to FL packet parser/sorter 730. Network triggering event manager 725 may identify if a portion of the received FL data is associated with the triggering event. If a particular packet of FL data is associated with the pre-determined triggering event, network triggering event manager 725 may notify packet FL parser/sorter 730. FL packet parser/sorter 730 may receive data from network interface 720 and place the FL data into appropriate FL data queues of FL data queue stack 705. Network triggering event manager 725 may also notify resource allocator 745, which may modify FL resource allocations to prioritize resources allocated to the multi-user access terminal 170 associated with the triggering event for the prioritized FL data. The type of prioritization of resource allocations may depend on the channel access technique used (e.g., increasing the number of time slots for TDMA, increasing the number of carriers for FDMA, etc.).

FL traffic shaper 735 may provide traffic management techniques to FL packet parser/sorter 730 in order to bring the data into compliance with a desired traffic profile and optimize performance. FL traffic shaper 735 may use techniques such as rate limiting according to service levels associated with various users of the communications system to perform prioritization of FL data associated with the triggering event. For example, FL traffic shaper may apply traffic shaping to other FL data streams to ensure that sufficient resources are available for prioritized FL data without causing service disruptions.

FL data queue stack 505 may store the data with regards to its priority/service rank. If FL packet parser/sorter 730 determines that a packet of data is associated with the triggering event, FL packet parser/sorter 730 may place the data in event-prioritized FL traffic queue 710. FL packet parser/sorter 730 may place other packets of data in corresponding queues such as service rank 1 FL traffic queue 515-*a* and service rank N FL traffic queue 515-*n*. Event-prioritized FL traffic queue 510 may receive a guaranteed minimum QoS or transmission rate while lower priority data packets in the queue may receive lesser transmission guarantees and quality. FL queue manager 740 may continuously manage the service ranks accorded to the data contained within FL data queue stack 705 (e.g., moving data from one service rank queue to another based on time in the queue, etc.).

FL packet scheduler 750 performs scheduling for FL resources (e.g., shared resources of a FL satellite beam, etc.). FL packet scheduler 750 may schedule FL packets from the FL data queue stack 705 and may schedule packets in the event-prioritized FL traffic queue 710 prior to scheduling packets in other queues. Packet scheduler 750 may then forward the data for transmission to shared link interface 760. Shared link interface 760 may then transmit the scheduled data over the FL resources to the aircraft (e.g., via a modem and an antenna).

Figure 8:
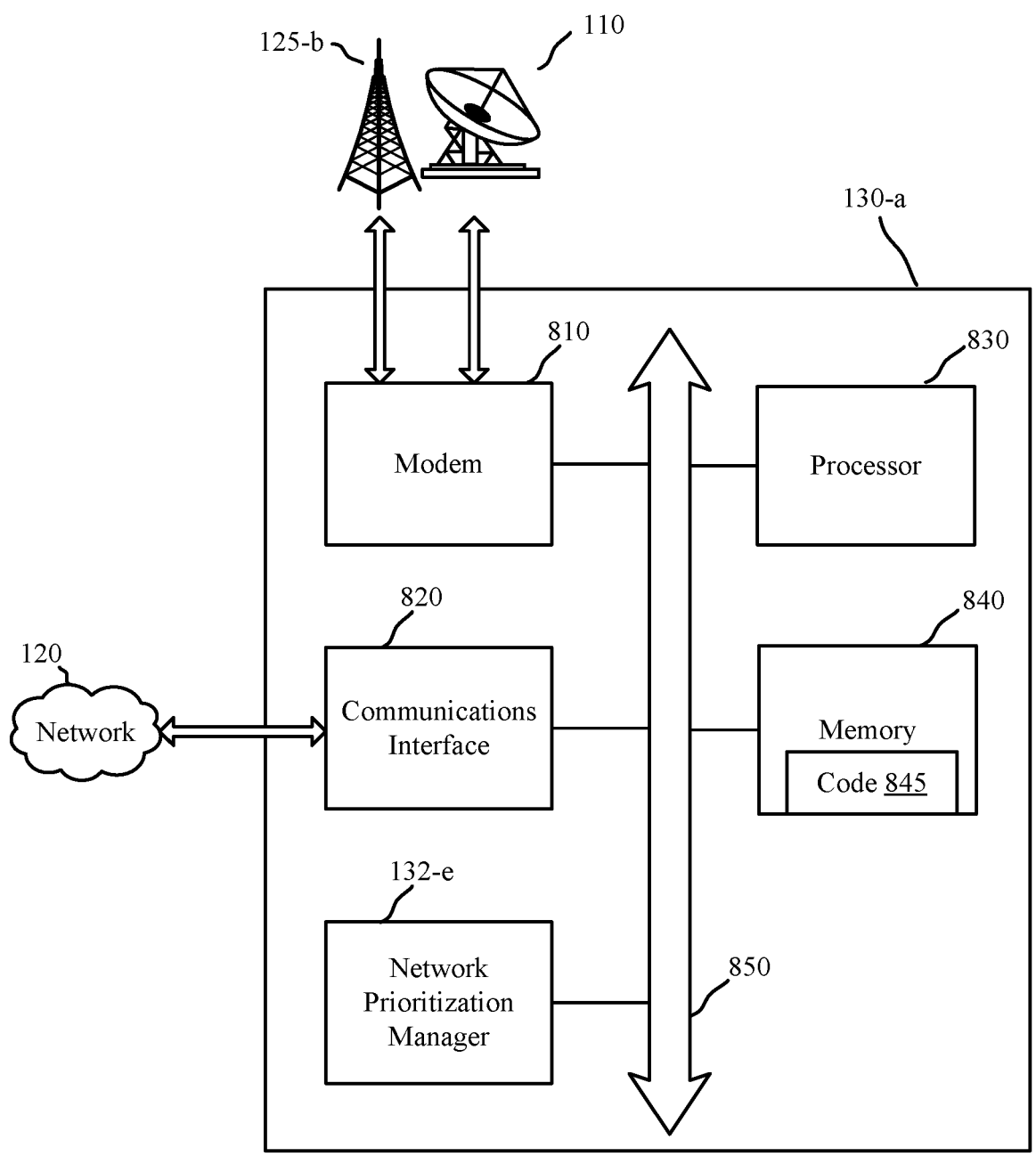
FIG. 8 is a block diagram illustrating an example of a network controller in accordance with various aspects of the disclosure.

FIG. 8 is a block diagram illustrating an example of a network controller 130-*a* in accordance with various aspects of the disclosure. The network controller 130-*a* may be an example of the network controllers 130 described with reference to FIGS. 1-3. The network controller 130-*a* may include a modem 810, communications interface 820, network prioritization manager 132-*e*, processor 830, memory 840, software code 845, and bus 850.

The components of network controller 130 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Modem 810 manages communications between the network controller 130 and both satellite(s) 105 and/or aircraft 185 via ground station antenna system 110 or ground network towers 125, respectively. Modem 810 may be configured to communicate with satellite(s) 105 over one or more frequency bands (e.g., Ka, Ku, etc.). Modem 810 may also be configured to communicate with aircraft 185 over one or more frequency bands allocated to ATG communication.

Communications interface module 820 controls network traffic via network 120. Network 120 may be any suitable type of network (e.g., LAN, WAN, etc.).

Processor module 830 may include an intelligent hardware device, e.g., a central processing unit (CPU), a microcontroller, an ASIC, etc. Processor module 830 may process information received through modem 810 or communications interface 820, or information to be sent to communications interface 820 or modem 810 for transmission. Processor module 830 may handle, alone or in connection with network prioritization manager 132, various aspects of prioritizing ensuing real-time data.

Memory 840 may include random access memory (RAM) or read-only memory (ROM). Memory 840 may store computer-readable, computer-executable code 845 containing instructions that are configured to, when executed, cause processor 830 to perform various functions described herein including prioritizing real-time data associated with a pre-defined triggering event. Alternatively, the code 845 may not be directly executable by processor 830 but be configured to cause network controller 130-e (e.g., when compiled and executed) to perform various of the functions described herein.

Network prioritization manager 132-e may, in conjunction with memory 840 and processor 830 perform the functions described above including prioritizing real-time data associated with a pre-defined triggering event. The functions of network prioritization manager 132-e may be found in the description regarding network prioritization manager 132-d of FIG. 7.

Figure 9:
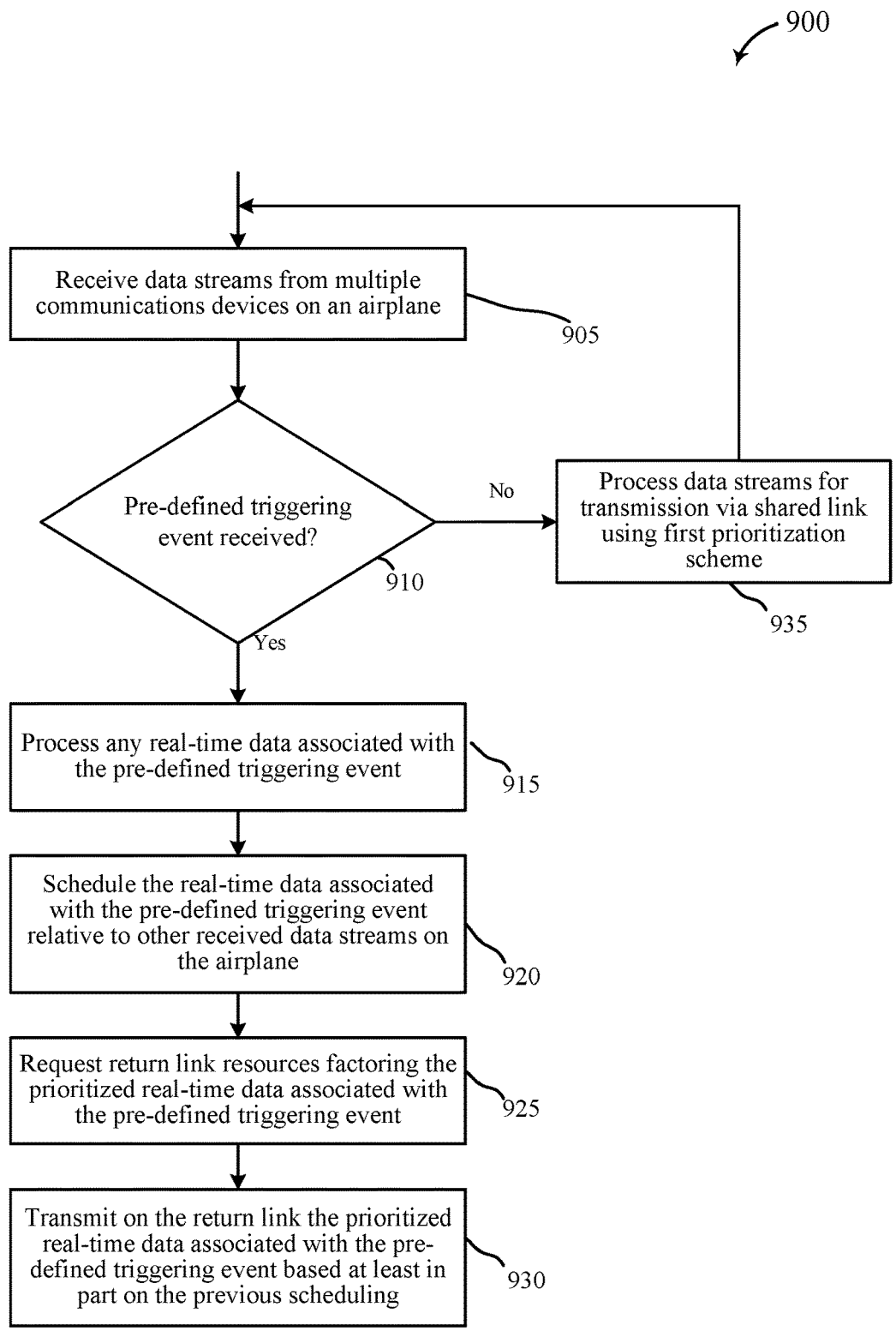
FIG. 9 is a flowchart diagram of an example method for providing prioritization over a shared communication link for real-time return link data associated with a pre-defined triggering event, in accordance with various aspects of the disclosure.

FIG. 9 is a flowchart diagram of an example method 900 for providing prioritization over a shared communication link for real-time return link data associated with a pre-defined triggering event, in accordance with various aspects of the disclosure. The method 900 may be performed, for example, by the multi-user access terminal 170 of FIGS. 1-3, 5 and 6.

At block 905 of method 900, multi-user access terminal 170 receives data streams from multiple communication devices (e.g., on aircraft 185 of FIG. 1). These multiple communication devices may be mobile devices 175, a triggering device 190, various aircraft diagnostic devices, etc. At decision block 910, method 900 determines if access terminal 170 has received a pre-defined triggering event indicating that a particular stream of real-time data is to be prioritized relative to the other data streams received at access terminal 170. The pre-defined triggering event may include activation of a HIPAA compliant computing device, activation of a HIPAA compliant application on triggering device 190 or a mobile device 175, or from a detected mechanical abnormality of equipment of the aircraft or an emergency state for the aircraft. The pre-defined triggering event may be either automatically or manually initialized. The triggering event may be identified by, for example, a terminal prioritization manager 172 of the multi-user access terminal 170.

If there is no triggering event identified at block 910, the method may process the data streams for transmission over the shared communication link at block 935. The method may then revert back to block 905 to receive additional data of the data streams.

If there is a triggering event identified at block 910, the method proceeds to block 915. Additionally, verification may be required from the triggering device that a user has authorized the indication associated with the pre-defined triggering event via a HIPAA compliant authorization procedure.

At block 915 access terminal 170 processes any real-time data associated with the identified pre-determined triggering event. The real-time data associated with the identified pre-determined triggering event may come from a myriad of sources such as a HIPAA compliant computing device, a device programmed with a HIPAA compliant application, or it may come from a diagnostic device on the aircraft which may indicate a detected mechanical abnormality of equipment of the aircraft or an emergency state for the aircraft. The real-time data may comprise of video teleconference data, biometric data, flight recorder data, messaging data, and/or flight status information.

At block 920, terminal prioritization manager 172 schedules the real-time data associated with the pre-determined triggering event relative to other data streams received by access terminal 170. Terminal prioritization manager 172 may utilize a variety of data scheduling and/or prioritization techniques which may be one or more of the following: placing the real-time data at the top of a transmission queue, provisioning a minimum data rate for the real-time data, or reducing a data rate associated with the other data of at least one of the communication devices for transmission via the communication link, as described in more detail above.

At block 925, a resource request for return link resources is generated by access terminal 170 for the prioritized real-time data associated with the pre-defined triggering event. Additionally, an indication that a pre-defined triggering event has occurred may be transmitted with the prioritized real-time data. At block 930 modem 610 may then transmit the data via antenna 165 factoring in the scheduling determined in blocks 920 and 925.

Figure 10:
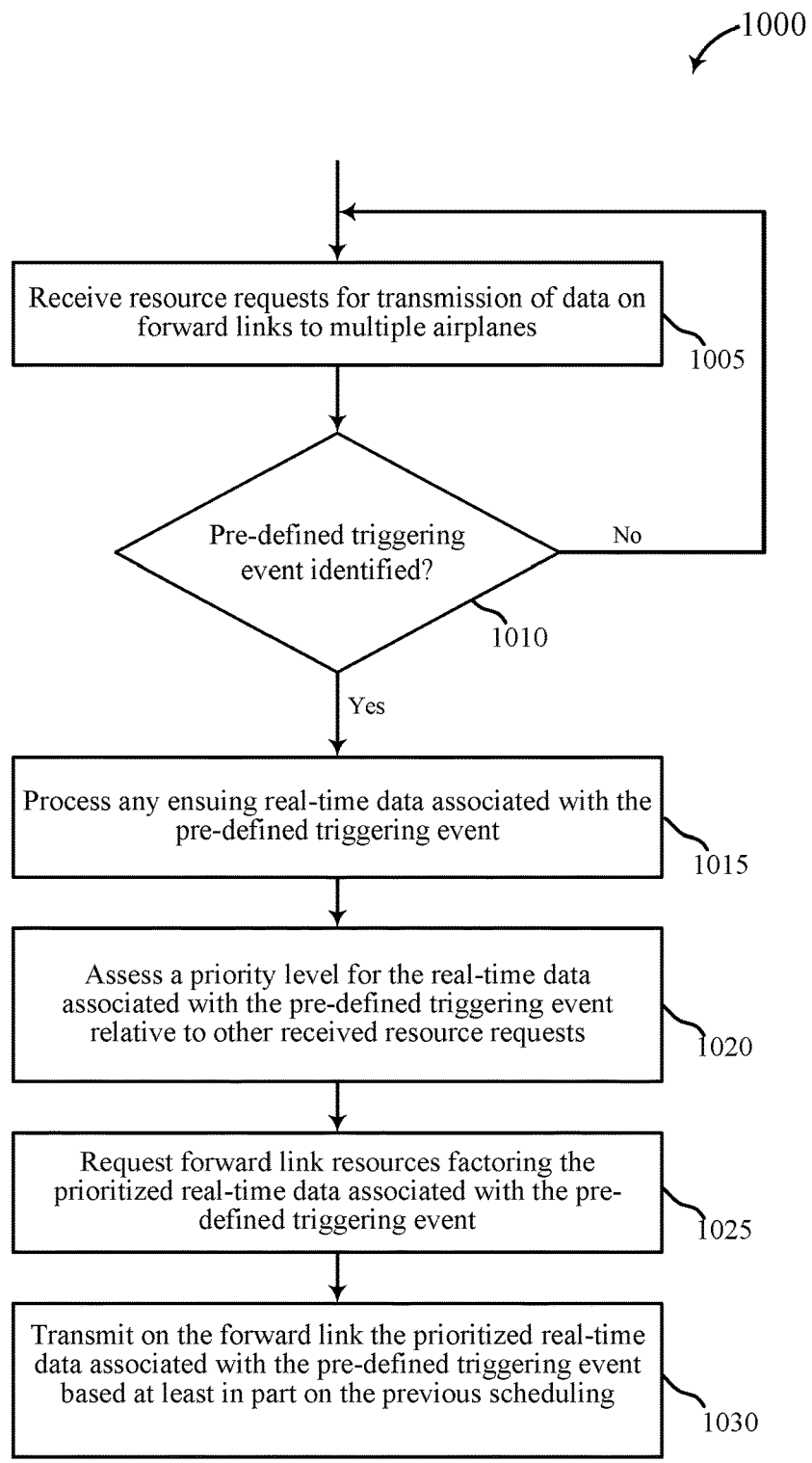
FIG. 10 is a flowchart diagram of an example method for prioritization over a shared communication link for forward link real-time data associated with a pre-defined triggering event, in accordance with various aspects of the disclosure.

FIG. 10 is a flowchart diagram of an example method 1000 for prioritization over a shared communication link for forward link real-time data associated with a pre-defined triggering event, in accordance with various aspects of the disclosure. The method may be performed, for example, by network controller 130 of FIGS. 1-3 and 8.

At block 1005 of method 1000, network controller 130 receives resource requests for transmission of data on forward links to multiple airplanes. The forward links may be, for example, satellite forward links 140 or ground network tower forward links 150. These resource requests from the multiple airplanes may utilize transmission resources of one or more shared communication links.

At decision block 1010, method 1000 determines if network controller 130 has identified a pre-defined triggering event indicating that a particular stream of real-time forward link data is to be prioritized relative to the other received data streams. The pre-defined triggering event may have been received in a transmission from aircraft 185, such as described in blocks 925 and 930 of FIG. 9. In another embodiment, an ensuing real-time forward link data stream associated with the prioritized real-time return link data stream transmitted in block 930 may have its own identifier that indicates that it is to be prioritized because of its relationship to the return link data stream in block 930. If there is no triggering event identified, the method reverts back to block 1005; if there is a triggering event identified, the method proceeds to block 1015.

At block 1015 network controller 130 processes any ensuing real-time forward link data associated with the identified pre-determined triggering event. The ensuing real-time data stream may comprise of one or more of the following: video teleconference data, biometric data, messaging data, and/or aircraft diagnostic communications.

At block 1020, network prioritization manager 132 schedules the ensuing real-time forward link data associated with the pre-determined triggering event relative to other data streams received by network controller 130. Network prioritization manager 132 may utilize a variety of data scheduling and/or prioritization techniques to prioritize the real-time forward link data associated with the pre-determined triggering event over other forward link data for the aircraft associated with the triggering device or other forward link data for multi-user network access terminals on other aircraft or fixed terminals that may share the same communication link (e.g., satellite beam) with the aircraft associated with the triggering device. Prioritization techniques may include traffic shaping, increasing bandwidth allocated to the aircraft, increasing the number of time slots allocated to the aircraft, or queue prioritization. The prioritization techniques may depend on the channel access method used.

At block 1025, a resource request for forward link resources is generated by network controller 130 for the prioritized ensuing real-time data associated with the pre-defined triggering event. At block 1030 modem 810 may then transmit the data via antenna 110 or ground network tower 125 factoring in the scheduling determined in blocks 1020 and 1025.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for consumer preference and maintenance interface.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method for communication in a communication system providing network access service to communication devices on multiple vehicles via one or more shared communication links, the method comprising:

receiving respective resource requests from respective vehicles of the multiple vehicles for network resources of the one or more shared communication links, the respective resource requests comprising a prioritized resource request associated with a triggering event from a vehicle of the multiple vehicles and at least one service rank resource request from one or more vehicles of the multiple vehicles, each of the at least one service rank resource request being in accordance with applying user-specific traffic policies to respective resource demands from the communication devices, wherein each of the at least one service rank resource request is associated with a respective data rate, and wherein the prioritized resource request is independent of the user-specific traffic policies;

identifying that the prioritized resource request is associated with the triggering event based at least in part on a header of a packet of a return link data stream from the vehicle being a header specific to triggering events;

allocating, based at least in part on identifying that the prioritized resource request is associated with the triggering event, return link resources of the one or more shared communication links for the prioritized resource request prior to allocating other return link resources of the one or more shared communication links for the at least one service rank resource request from the one or more vehicles of the multiple vehicles; and transmitting respective grants of the allocated return link resources to the multiple vehicles.

2. The method of claim 1, wherein the prioritized resource request indicates an amount of requested resources associated with first return link data associated with the triggering event and the at least one service rank resource request comprises one or more first service rank resource requests associated with second return link data associated with one or more communication devices on the vehicle.

3. The method of claim 2, wherein the allocating the return link resources for the prioritized resource request comprises:
allocating the return link resources to the vehicle in the amount of the requested resources associated with the first return link data associated with the triggering event.

4. The method of claim 1, further comprising:
identifying an ensuing forward link data stream generated in response to the triggering event, the ensuing forward link data stream and the triggering event being associated with a same session; and
prioritizing the ensuing forward link data stream over other data streams for transmission to the vehicle or other vehicles of the multiple vehicles.

5. The method of claim 4, wherein the ensuing forward link data stream is associated with a triggering device that indicated the triggering event.

6. The method of claim 4, wherein prioritizing the ensuing forward link data stream is based at least in part on a channel access method utilized for transmission of the ensuing forward link data stream.

7. The method of claim 4, wherein the ensuing forward link data stream comprises video teleconference data, biometric data, messaging data, and/or vehicle diagnostic communications.

8. The method of claim 4, wherein prioritizing the ensuing forward link data stream for transmission comprises:
performing traffic shaping on the other data streams associated with other communication devices apart from a triggering device associated with the triggering event on the vehicle.

9. The method of claim 8, wherein performing the traffic shaping further comprises:
determining a buffering threshold for one or more of the other communication devices, wherein the traffic shaping is based at least in part on the buffering threshold.

10. The method of claim 4, wherein the prioritizing comprises increasing an allocated bandwidth for the ensuing forward link data stream, increasing a number of allocated time slots for the ensuing forward link data stream, or a combination thereof.

11. The method of claim 4, wherein prioritizing the ensuing forward link data stream for transmission comprises:
clearing a queue associated with the ensuing forward link data stream prior to clearing other queues associated with the other data streams.

12. The method of claim 1, wherein the allocating the return link resources of the one or more shared communication links further comprises:
scaling allocated return link resources in the other return link resources for remaining respective resource requests.

13. The method of claim 1, wherein the allocating the return link resources of the one or more shared communication links further comprises:
allocating the return link resources to the vehicle in at least an amount of the prioritized resource request.

14. The method of claim 13, wherein allocating return link resources of the one or more shared communication links further comprises:
allocating the other return link resources to the one or more vehicles of the multiple vehicles respective amounts less than the respective resource requests from the one or more vehicles.

15. The method of claim 1, wherein the at least one service rank resource request indicates an amount of requested resources for each of a plurality of service ranks.

16. The method of claim 15, wherein the allocating the return link resources of the one or more shared communication links further comprises:
allocating the other return link resources according to remaining respective resource requests and the plurality of service ranks.

17. The method of claim 1, further comprising:
pre-allocating forward link resources based at least in part on the prioritized resource request.

18. An apparatus for communication in a communication system providing network access service to communication devices on multiple vehicles via one or more shared communication links, comprising:
a network controller comprising a processor and memory in electronic communication with the processor, and instructions stored in the memory, the instructions operable, when executed by the processor, to cause the network controller to:
receive respective resource requests from respective vehicles of the multiple vehicles for network resources of the one or more shared communication links, the respective resource requests comprising a prioritized resource request associated with a triggering event from a vehicle of the multiple vehicles and at least one service rank resource request from one or more vehicles of the multiple vehicles, each of the at least one service rank resource request being in accordance with applying user-specific traffic policies to respective resource demands from the communication devices, wherein each of the at least one service rank resource request is associated with a respective data rate, and wherein the prioritized resource request is independent of the user-specific traffic policies;
identify that the prioritized resource request is associated with the triggering event based at least in part on a header of a packet of a return link data stream from the vehicle being a header specific to triggering events;
allocate, based at least in part on identifying that the prioritized resource request is associated with the triggering event, return link resources of the one or more shared communication links for the prioritized resource request prior to allocating other return link resources of the one or more shared communication links for the at least one service rank resource request from the one or more vehicles of the multiple vehicles; and
transmit respective grants of the allocated return link resources to the multiple vehicles.

19. The apparatus of claim 18, wherein the prioritized resource request indicates an amount of requested resources associated with first return link data associated with the triggering event and the at least one service rank resource request comprises one or more first service rank resource requests associated with second return link data associated with one or more communication devices on the vehicle.

20. The apparatus of claim 19, wherein, to allocate the return link resources for the prioritized resource request, the instructions are operable to cause the network controller to:

allocate the return link resources to the vehicle in the amount of the requested resources associated with the first return link data associated with the triggering event.

21. The apparatus of claim 18, wherein the instructions are operable to cause the network controller to:
identify an ensuing forward link data stream generated in response to the triggering event, the ensuing forward link data stream and the triggering event being associated with a same session; and
prioritize the ensuing forward link data stream over other data streams for transmission to the vehicle or other vehicles of the multiple vehicles.

22. The apparatus of claim 21, wherein the ensuing forward link data stream is associated with a triggering device that indicated the triggering event.

23. The apparatus of claim 21, wherein prioritizing the ensuing forward link data stream is based at least in part on a channel access method utilized for transmission of the ensuing forward link data stream.

24. The apparatus of claim 21, wherein the ensuing forward link data stream comprises video teleconference data, biometric data, messaging data, and/or vehicle diagnostic communications.

25. The apparatus of claim 21, wherein the instructions are operable to cause the network controller to:
perform traffic shaping on the other data streams associated with other communication devices apart from a triggering device associated with the triggering event on the vehicle.

26. The apparatus of claim 25, wherein the instructions are operable to cause the network controller to:
determine a buffering threshold for one or more of the other communication devices, wherein the traffic shaping is based at least in part on the buffering threshold.

27. The apparatus of claim 21, wherein the instructions are operable to cause the network controller to:
increase an allocated bandwidth for the ensuing forward link data stream, increase a number of allocated time slots for the ensuing forward link data stream, or a combination thereof.

28. The apparatus of claim 21, wherein the instructions are operable to cause the network controller to:
clear a queue associated with the ensuing forward link data stream prior to clearing other queues associated with the other data streams.

29. The apparatus of claim 18, wherein the instructions are operable to cause the network controller to:
scale allocated return link resources in the other return link resources for remaining respective resource requests.

30. The apparatus of claim 18, wherein, to allocate the return link resources of the one or more shared communication links, the instructions are operable to cause the network controller to:
allocate the return link resources to the vehicle in at least an amount of the prioritized resource request.

31. The apparatus of claim 30, wherein, to allocate the return link resources of the one or more shared communication links, the instructions are operable to cause the network controller to:
allocate the other return link resources to the one or more vehicles of the multiple vehicles respective amounts less than the respective resource requests from the one or more vehicles.

32. The apparatus of claim 18, wherein the at least one service rank resource request indicates an amount of requested resources for each of a plurality of service ranks.

33. The apparatus of claim 32, wherein the instructions are operable to cause the network controller to:
allocate the other return link resources according to remaining respective resource requests and the plurality of service ranks.

34. The apparatus of claim 18, wherein the instructions are operable to cause the network controller to:
pre-allocate forward link resources based at least in part on the prioritized resource request.

\* \* \* \* \*